United States Patent
Karer et al.

(10) Patent No.: US 8,034,884 B2
(45) Date of Patent: Oct. 11, 2011

(54) GASEOUS PHASE FLUIDIZED-BED REACTOR

(76) Inventors: Rainer Karer, Kaiserslautern (DE);
Kaspar Evertz, Schifferstadt (DE);
Wolfgang Micklitz, Neustadt (DE);
Hans-Jacob Feindt, Raritan Township, NJ (US); Philipp Rosendorfer, Neustadt (DE); Peter Kölle, Bad Dürkheim (DE)

( * ) Notice: Subject to any disclaimer, the term of this patent is extended or adjusted under 35 U.S.C. 154(b) by 0 days.

(21) Appl. No.: 12/554,964

(22) Filed: Sep. 7, 2009

(65) Prior Publication Data
US 2010/0056734 A1    Mar. 4, 2010

Related U.S. Application Data

(62) Division of application No. 09/700,367, filed as application No. PCT/EP99/03007 on May 4, 1999, now Pat. No. 7,601,303.

(30) Foreign Application Priority Data

May 15, 1998 (DE) ................... 198 21 955
Feb. 5, 1999 (DE) ................... 199 04 811

(51) Int. Cl.
*C08F 2/00*    (2006.01)
*B01J 8/18*    (2006.01)

(52) U.S. Cl. ........ 526/72; 48/127.1; 48/197 R; 422/139; 422/143; 422/145; 422/146; 422/198; 422/234; 422/235

(58) Field of Classification Search .............. 422/139, 422/143, 145, 146, 198, 234, 235
See application file for complete search history.

(56) References Cited

U.S. PATENT DOCUMENTS

| | | | |
|---|---|---|---|
| 2,636,712 A | 4/1953 | Lubbock | |
| 3,298,792 A | 1/1967 | Di Drusco | |
| 4,720,235 A | 1/1988 | Lachance et al. | |
| 6,113,862 A | 9/2000 | Jorgensen et al. | |
| 6,413,477 B1 * | 7/2002 | Govoni et al. | 422/131 |

FOREIGN PATENT DOCUMENTS

| | | |
|---|---|---|
| DE | 4443292 A1 | 6/1996 |
| EP | 0047794 A1 | 3/1982 |
| EP | 0101893 A2 | 3/1984 |
| EP | 0202076 A1 | 11/1986 |
| EP | 0297794 A1 | 1/1989 |

(Continued)

OTHER PUBLICATIONS

Notice of Allowability in U.S. Appl. No. 09/700,367 mailed Jun. 26, 2009 (5 pages).

(Continued)

*Primary Examiner* — Kaity V. Handal
(74) *Attorney, Agent, or Firm* — Novak Druce + Quigg LLP

(57) ABSTRACT

Gas-phase fluidized-bed reactor for polymerizing ethylenically unsaturated monomers, comprising a reactor chamber (1) in the form of a vertical tube, if desired a calming zone (2) following the upper section of the reactor chamber, a circulation gas line (3), a circulation gas compressor (4) and a cooling device (5), where, in the region of transition of the reaction gas from the circulation gas line into the reactor chamber and in the lower section of the reactor chamber itself, there is either no gas distributor plate at all or only a gas distributor plate the total surface area of whose gas orifices is more than 20% of the total surface area of said gas distributor plate.

11 Claims, 4 Drawing Sheets

FOREIGN PATENT DOCUMENTS

| | | |
|---|---|---|
| EP | 0549252 A1 | 6/1993 |
| EP | 0697421 A1 | 2/1996 |
| EP | 0825204 A1 | 2/1998 |

OTHER PUBLICATIONS

Notice of Allowance & Allowability in U.S. Appl. No. 09/700,367 mailed Jun. 1, 2009 (8 pages).

Board of Patent Appeals and Interferences Decision in U.S. Appl. No. 09/700,367 mailed Mar. 26, 2009 (20 pages).

Examiner's Answer in U.S. Appl. No. 09/700,367 mailed Apr. 4, 2008 (12 pages).

Notice of Panel Decision from Pre-Appeal Brief Review in U.S. Appl. No. 09/700,367 mailed Dec. 17, 2007 (2 pages).

Advisory Action in U.S. Appl. No. 09/700,367 mailed Oct. 31, 2007 (3 pages).

Final Office action in U.S. Appl. No. 09/700,367 mailed Aug. 9, 2007 (9 pages).

Decision on Petition in U.S. Appl. No. 09/700,367 mailed Jun. 26, 2007 (2 pages).

Advisory Action in U.S. Appl. No. 09/700,367 mailed Dec. 26, 2006 (3 pages).

Final Office action in U.S. Appl. No. 09/700,367 mailed Sep. 29, 2006 (8 pages).

Non-final Office action in U.S. Appl. No. 09/700,367 mailed Apr. 17, 2006 (7 pages).

Non-final Office action in U.S. Appl. No. 09/700,367 mailed Nov. 16, 2005 (7 pages).

Final Office action in U.S. Appl. No. 09/700,367 mailed Aug. 16, 2005 (9 pages).

Non-final Office action in U.S. Appl. No. 09/700,367 mailed Jan. 26, 2005 (11 pages).

Non-final Office action in U.S. Appl. No. 09/700,367 mailed Oct. 18, 2004 (4 pages).

Non-final Office action in U.S. Appl. No. 09/700,367 mailed Jun. 17, 2004 (5 pages).

International Search Report in International Application No. PCT/EP99/03007 mailed Oct. 21, 1999 (5 pages).

International Preliminary Examination Report in International Application No. PCT/EP99/03007 dated Sep. 1, 2000 (4 pages).

Fluidization Engineering, 2d ed., Chapter 4, The Dense Bed: Distributors, Gas Jets, and Pumping Power, pp. 95-97 and 102-106, Daizo Kunii and Octave Levenspiel eds., Butterworth-Heinemann, Boston, 1991.

\* cited by examiner

GASEOUS PHASE FLUIDIZED-BED REACTOR

This is a Divisional application of application Serial No. 09/700,367 filed on Nov. 15, 2000 (now U.S. Pat. No. 7,601,303), the entire disclosure of which is hereby incorporated by reference, which is a national stage entry of PCT/EP99/03007 filed on May 04, 1999.

The present invention relates to a gas-phase fluidized-bed reactor for polymerizing ethylenically unsaturated monomers, comprising a reactor chamber (1) in the form of a vertical tube, if desired a calming zone (2) following the upper section of the reactor chamber, a circulation gas line (3), a circulation gas compressor (4) and a cooling device (5), wherein, in the region of transition of the reaction gas from the circulation gas line into the reactor chamber and in the lower section of the reactor chamber itself, there is either no gas distributor more than 20% of the total surface area of said gas distributor plate. The schematic construction of the reactor is shown in FIG. 1. The invention also relates to processes for polymerizing ethylene or for copolymerizing ethylene with $C_3$- to $C_8$-α-olefins and for preparing ethylene-propylene-diene monomer rubbers (EPDM) which are conducted in such a reactor.

Gas-phase polymerization processes are nowadays among the preferred processes for polymerizing ethylenically unsaturated monomers, especially ethylene, alone or in the presence of further unsaturated monomers. In this context, polymerization processes in fluidized beds are regarded as particularly economical.

Gas-phase fluidized-bed reactors for conducting such processes have long been known. The reactors which are common at present share numerous structural features: they consist, inter alia, of a reactor chamber in the form of a vertical tube whose upper section is usually of expanded diameter. Owing to the larger tube diameter in this calming zone there is a reduced gas flow, which limits the discharge of the fluidized bed consisting of small polymer particles. Furthermore, these reactors include a circulation gas line, which accommodates cooling units to dissipate the heat of polymerization, a compressor, and, if desired, further elements, such as a cyclone for removing fine polymer dust, for example. Examples of such gas-phase fluidized-bed reactors have been described, for example, in EP-A-0 202 076, EP-A-0 549 252 and EP-A-0 697 421.

All known gas-phase fluidized-bed reactors possess, in the lower section of the reaction chamber, a reactor plate which spatially closes off the reaction chamber from the circulation gas line and the gas distribution area. The function of this reactor plate is firstly to prevent the polymer particles flowing back into the circulation gas pipe when the compressor is switched off. Secondly, the general technical teaching is that the pressure loss occurring at this reactor plate owing to the relatively narrow entry aperture ensures uniform distribution of gas in the reactor chamber. This taught opinion is expressed, for example, in U.S. Pat. No. 3,298,792 and EP-A-0 697 421.

A reactor plate in the form that is nowadays customary, i.e., a narrow-mesh grid or a metal plate with narrow bores of various geometry, however, has a number of disadvantages: on both the side of the plate which confronts the flow and on the top side of the plate there may be continual instances of polymer deposition caused by dustlike polymer and catalyst particles which are entrained by the gas flow into the circulation gas line. This risk is increased in the case of what is known as condensed-mode operation: that is, when there are liquid monomers in the circulation gas. In addition to these deposits, which may lead to an increase in pressure and, ultimately, to a termination of the polymerization process, however, the pressure loss in normal operation also gives rise to additional energy costs, since the compressor has to compensate for this pressure loss by a higher output.

It is an object of the present invention to provide a gas-phase fluidized-bed reactor which no longer has these disadvantages.

We have found that this object is achieved by the gas-phase fluidized-bed reactor described at the outset and by processes for (co)polymerization in such a reactor.

The gas-phase fluidized-bed reactor of the invention is suitable in principle for polymerizing various ethylenically unsaturated monomers. Examples are ethylene, propylene, 1-butene, isobutene, 1-pentene, 1-hexene, 1-heptene, 1-octene and higher α-olefins, and also dienes such as butadiene and cyclopentadiene, and cycloolefins, such as cyclopentene and cyclohexene. The ethylenically unsaturated monomers can be polymerized alone or in a mixture. The reactor of the invention is particularly suitable for homopolymerizing ethylene, for preparing ethylene-hexene and ethylene-butene copolymers, and for preparing EPDM.

In a preferred embodiment of the gas-phase fluidized-bed reactor of the invention there is no gas distributor plate in the region of transition of the reaction gas from the circulation gas line into the reactor chamber or in the lower section of the reactor chamber itself.

Preference also attaches to a reactor in which, in the region of transition of the reaction gas from the circulation gas line into the reactor chamber or in the lower section of the reaction chamber itself, there is a gas distributor plate the total surface area of whose gas orifices is more than 50%, with particular preference more than 90%, of the total surface area of said gas distributor plate.

Where a reactor plate is done away with entirely, and also for the other plate constructions with very low pressure loss, flow reshapers should be sited at the point of transition of the circulation gas from the circulation gas line into the reaction chamber in order to reshape the flow pulse of the incoming gas, especially in the case of reactors of large dimension. This can be realized by means of various gas diversion devices, such as guide vanes, deflectors, impact plates or the like, as are familiar to the person skilled in the art.

Preference is given to gas-phase fluidized-bed reactors in which flow guide vanes are sited in the region of transition of the reaction gas from the circulation gas line into the reactor chamber in order to reshape the flow pulse of the incoming gas, said vanes being arranged so as to bring about substantially homogeneous introduction of the gas flow into the fluidized bed. The terms plate, deflector and vane as used herein do not of course imply the material from which the device is made but merely its form and function; the nature of the material is unimportant provided it is compatible with the polymerization conditions.

A further preferred apparatus for gas distribution on entry into the reaction chamber of the reactor of the invention consists of a wide-mesh grid which is sited in the region of transition of the reaction gas from the circulation gas line into the reactor chamber in order to reshape the flow pulse of the incoming gas and on which balls are fixed in such number, size and distribution as to bring about substantially homogeneous introduction of the gas flow into the fluidized bed. Said grid should be so wide-meshed that it causes virtually no pressure loss; the function of this grid is to hold the balls, which act as diverters or deflectors for the gas flow, in the desired position. The balls can be distributed uniformly over the grid. In the case of reactors of large diameter in particular, however, it may be sensible to dispose a greater number of such balls in the region of the reactor axis—that is, directly over the point of inward flow of gas in the centre of the reactor cross section—than in the edge region.

Instead of the balls it is of course also possible to use other geometric structures; balls, however, are preferred since they bring about a particularly uniform and low-turbulence distribution of gas.

The gas-phase fluidized-bed reactors of the invention exhibit their advantageous properties in particular on the industrial scale. Preferred reactors in this context are those in which the internal diameter of the reaction chamber (1) is more than 0.5 m and, with particular preference, more than 1 mm. Particularly advantageous reactors are those having internal diameters of between 2 and 8 m.

To prevent relatively large amounts of solid entering the circulation gas system the reactor of the invention may be provided with various means of gas/solid separation. In one embodiment of the reactor of the invention, as already mentioned, a calming zone (2) follows the upper section of the reactor chamber (1). In another embodiment of the gas-phase fluidized-bed reactor of the invention, between the reactor chamber (1) and the units of the circulation gas line there is sited a cyclone to separate off polymer and catalyst particles from the circulation gas. If desired, this cyclone may also be combined with a calming zone (2). In another embodiment, there is no such calming zone, so that the circulation gas line and/or, additionally, a means of separating polymer and catalyst particles from the circulation gas, i.e., for example, a cyclone, ajoins the reactor chamber directly. For the case as well where the reactor comprises neither a calming zone nor any other means of separating circulation gas and solid, the term "reactor chamber" should be understood as meaning that in this part of the reactor essentially the polymerization takes place and parts of the polymer are circulated with the circulation gas only to a minor extent.

Since the reactors of the invention do not have a reactor plate which is able to prevent the flow of polymer particles back into the circulation gas line when the compressor is switched off, it may be judicious to take measures to prevent such flow. For example, a flap or a slide can be sited in the region of the outlet of the circulation gas line into the reaction chamber, and when the compressor is switched off and when, for example, the reactor is being filled prior to the beginning of polymerization said flap or slide can be closed but is open when the compressor is started up. A preferred embodiment of the invention envisages the closable flap or slide being provided with uniformly distributed holes having a diameter of preferably between 1 and 7 mm. With the aid of such a flap it is possible to fluidize the bed when the flap is closed at the beginning.

In accordance with the invention, the gas-phase fluidized-bed reactor described herein is particularly suitable for the implementation of processes for polymerizing ethylene or for copolymerizing ethylene with $C_3$- to $C_8$-α-olefins as specified at the outset. Furthermore, a preferred process for preparing EPDM is that wherein the copolymerization is conducted in a reactor of the invention.

DETAILED DESCRIPTION

Figure 1:
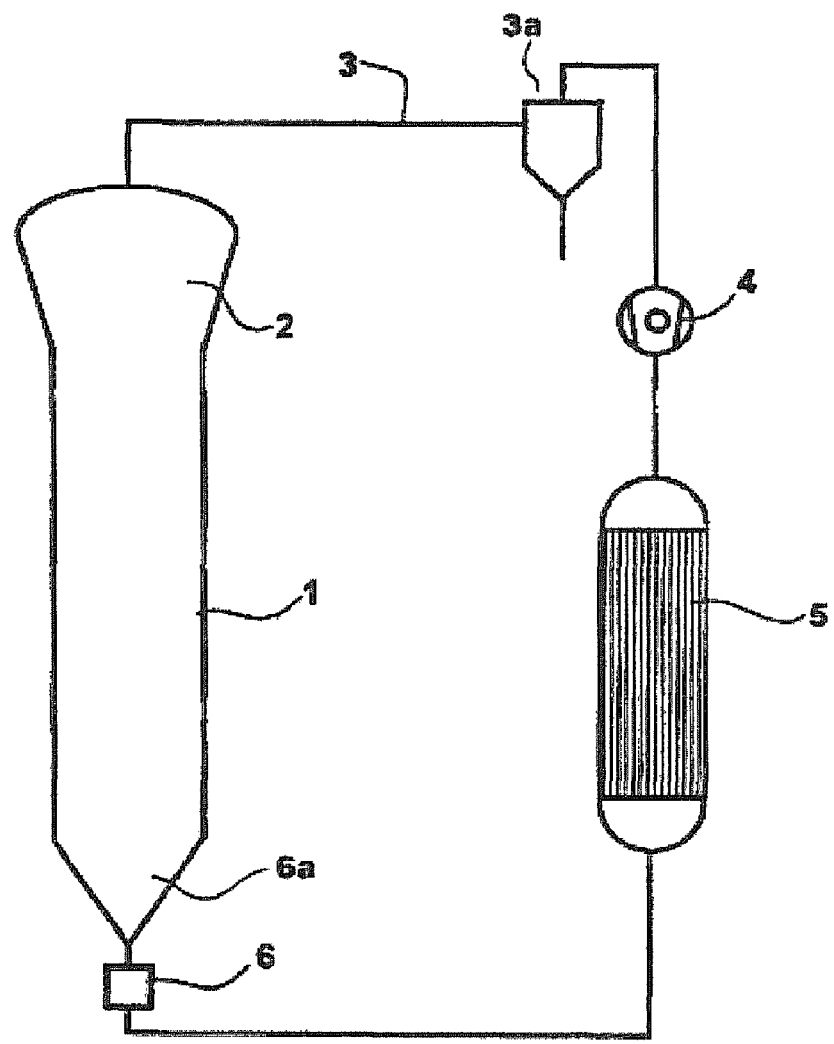
FIG. 1 schematically illustrates an embodiment of the gas-phase fluidized-bed reactor of the present invention without a gas distributor plate.
Figure 2:
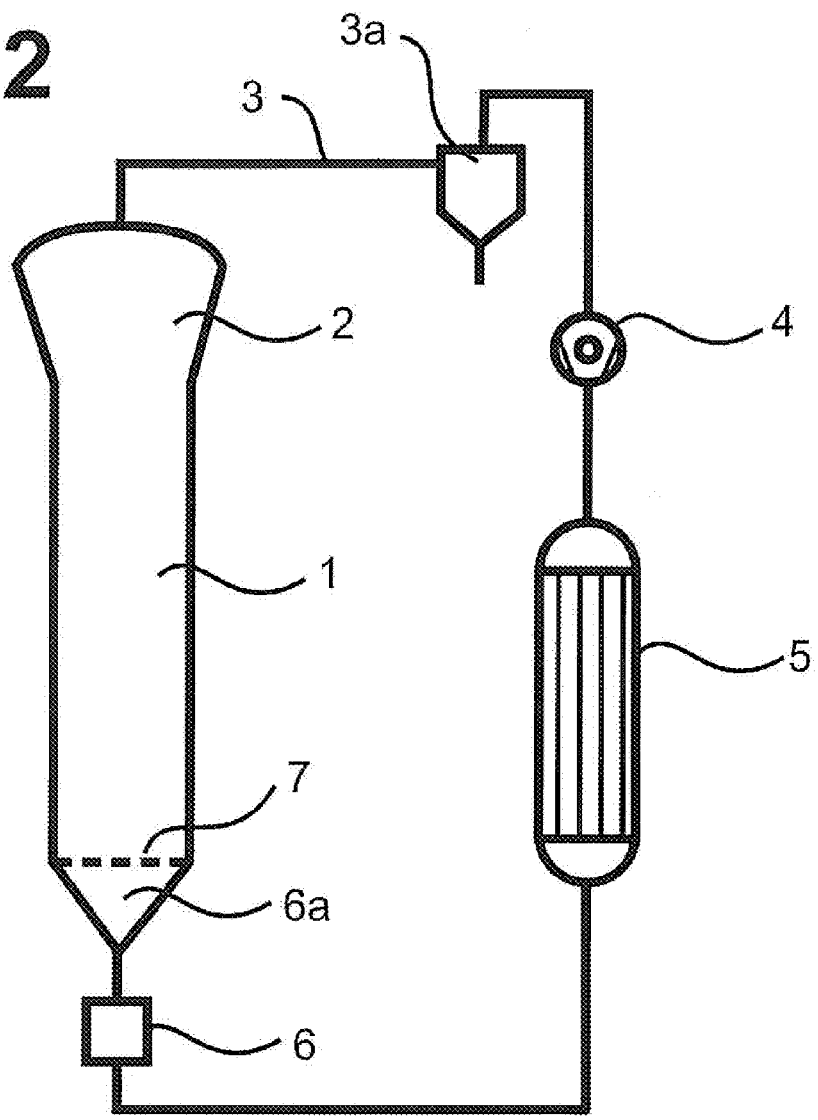
FIG. 2 schematically illustrates an embodiment of the gas-phase fluidized-bed reactor of the present invention with a gas distributor plate in the region of transition.
Figure 5:
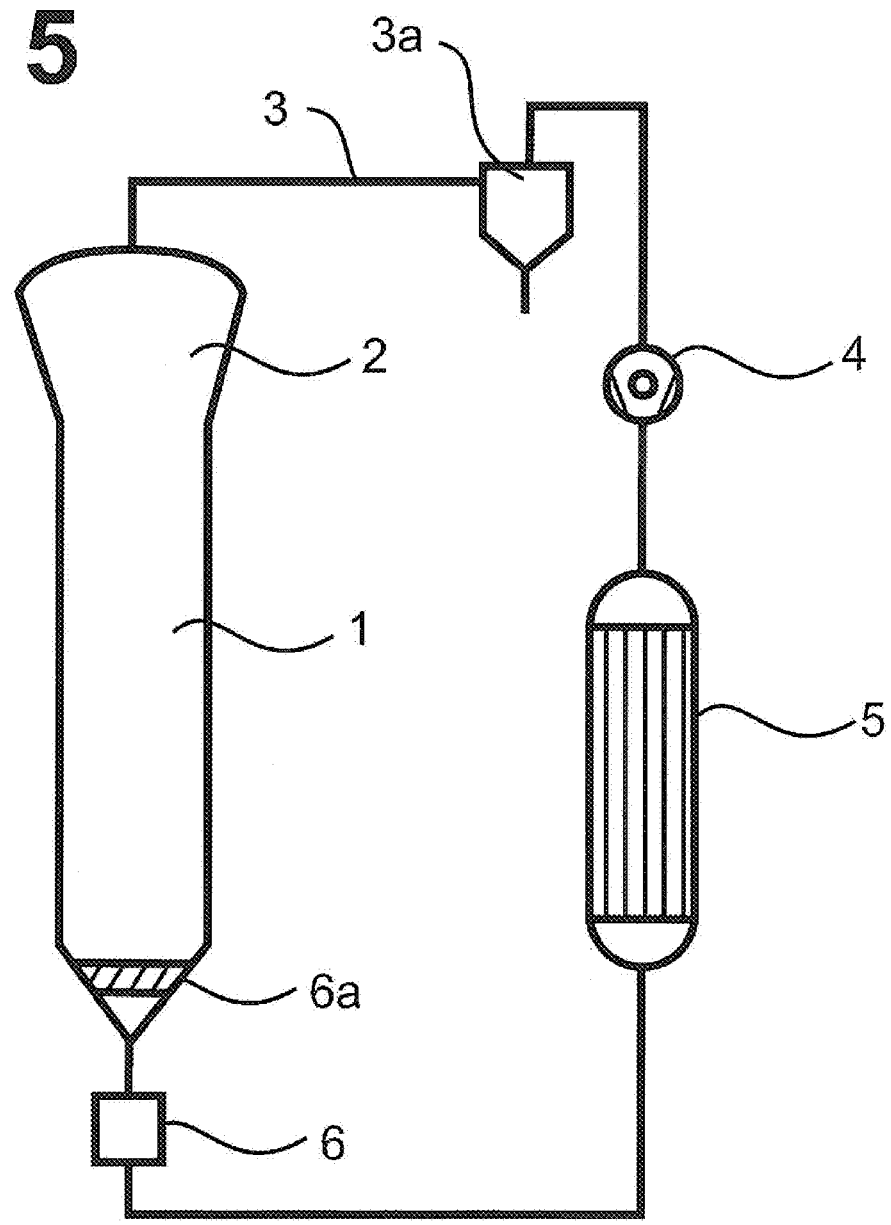
FIG. 5 schematically illustrates an embodiment of the gas-phase fluidized-bed reactor of the present invention which is equipped with flow reshapers in the region of transition.

FIGS. 1, 2, and 5 show a gas-phase fluidized-bed reactor according to various embodiments. As illustrated, the reactor can comprise a reactor chamber (1), which is in the form of a vertical tube. The reactor chamber can have a region of transition (6a) in the lower section of the tube, followed by a reaction zone which is followed by a calming zone (2) in the upper section of the tube. A circulation gas line (3) can be connected to the upper section and the lower section of the reactor chamber (1) to convey reaction gas from the calming zone (2) to the region of transition (6a). The circulation gas line (3) can be equipped with a cyclone (3a) to separate off polymer and catalyst particles from the circulation gas, a circulation gas compressor (4), and a cooling device. The circulation gas line can comprise, in the region of transition (6a) a closable flap (6) to prevent the penetration of polymer particles into the circulation gas line when the compressor is switched off.

The embodiment illustrated in FIG. 1 has no gas distributor plate in the region of transition. The embodiment illustrated in FIG. 2 has a gas distributor plate (7) in the region of transition. The embodiment illustrated in FIG. 5 has flow reshapers (6b) in the region of transition.

Figure 3:
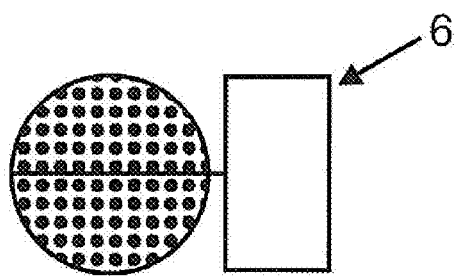
FIG. 3 schematically illustrates a closable flap.

FIG. 3 shows a closable flap, which is provided with uniformly distributed holes, which makes it possible to fluidize the catalyst bed when the flap is closed.

Figure 4A:
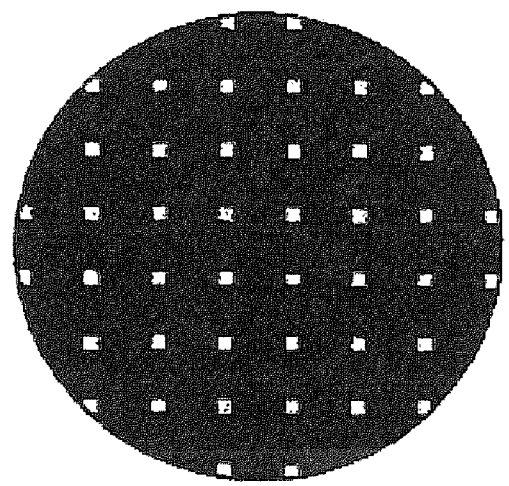
FIGS. 4a to 4c schematically illustrate gas distributor plates in which orifices occupy varying percentages of the surface area.
Figure 4B:
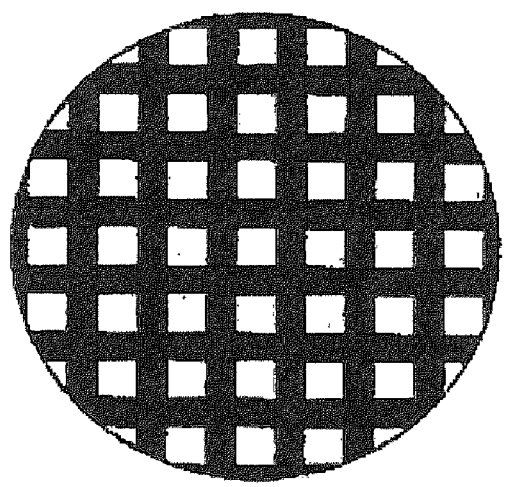
Figure 4C:
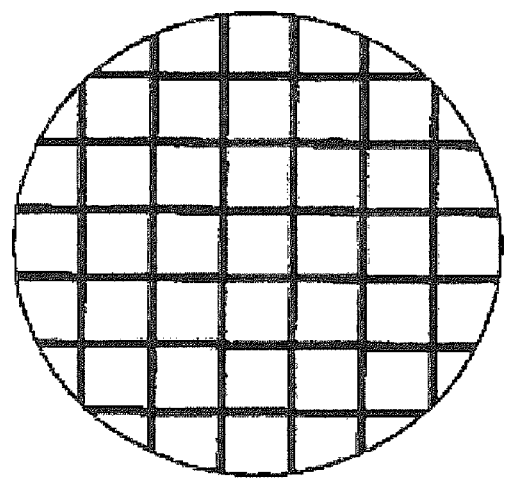

FIGS. 4a and 4c are representations of gas distributor plates having orifices that occupy varying percentages of the surface area. More specifically, FIG. 4a is a representation of a gas distributor plate wherein orifices, represented as white areas, occupy more than 20% of the surface area, i.e., the gas distributor plate obstructs less than 80% of the cross-section surface area of the region of transition. FIG. 4b is a representation of a gas distributor plate wherein orifices, represented as white areas, occupy at least 50% of the surface area, i.e., the gas distributor plate obstructs less than 50% of the cross-section surface area of the region of transition. FIG. 4c is a representation of a gas distributor plate wherein orifices, represented as white areas, occupy at least 90% of the surface area, i.e., the gas distributor plate obstructs less than 10% of the cross-section surface area of the region of transition.

Since there is a limited risk, if any of polymer deposits in the region of the reactor plate it is possible to dispense with numerous complex precautionary measures which are frequently taken when using conventional gas distribution plates. For example, the installation of a cyclone to separate off fine dust at the outlet from the reaction chamber is generally superfluous. It is also possible without problems to meter in liquid monomer, and to do so in a larger amount than is otherwise the case with the condensed mode of operation. Carrying out the process of the invention in the presence of condensed monomers is therefore particularly advantageous.

Accordingly, one advantageous embodiment of the process of the invention is that wherein a mixture comprising gaseous and liquid monomers is fed into the reactor chamber.

The polymerization process of the invention is carried out such that the polymerization takes place essentially in the reactor chamber (1) and only small amounts of particles circulate with the circulation gas. This can be achieved by means of the abovementioned means of gas/solid separation. Often, however, it is possible to do without such means to a very large extent, if the polymerization is conducted only just below the softening temperature of the polymers.

A preferred embodiment of the process of the invention is therefore that wherein to prepare a (co)polymer of a preselected density d the (co)polymerization is conducted at a temperature situated within a range bounded by an upper limit of equation (I)

$$T_H = 171 + \frac{6d'}{0.84 - d'}$$

and a lower limit of equation (II)

$$T_L = 173 + \frac{7.3d'}{0.837 - d'}$$

where
$T_H$ is the highest reaction temperature in ° C.
$T_L$ is the lowest reaction temperature in ° C.
d' is the numerical value of the density (d) of the (co) polymer to be prepared.
This high-temperature mode of operation means that only a small proportion of fine dust occurs, so that separation of the solids is usually superfluous.

Example

In a fluidized-bed reactor according to FIG. 1 having a reaction chamber internal diameter of 0.5 m and a reaction chamber height of 3 m a flow reshaper was sited in the entry region of the reaction chamber. There was no gas distributor plate.

Copolymerization was carried out in this reactor under the following conditions:

| | |
|---|---|
| Gas composition: | 50% ethylene |
| | 45% nitrogen |
| | 5% 1-butene |
| Circulation gas rate: | 35 m/s |
| Temperature: | 115° C. |
| Pressure: | 20 bar |

Polymerization was carried out continuously for 60 h. When the reactor was opened after polymerization, no lumps or deposits whatsoever were visible.

We claim:

1. A process comprising polymerizing at least one ethylenically unsaturated monomer in a gas-phase fluidized-bed reactor, the reactor comprising
    a single reactor chamber in the form of a vertical tube which has a region of transition in the lower section of the tube followed by a reaction zone which is followed by a calming zone in the upper section of the tube,
    a circulation gas line, wherein the circulation gas line is connected to the lower section of the reactor chamber, wherein the circulation gas line is directly connected to the upper section of the reaction chamber, and wherein the circulation gas line is adapted to convey a reaction gas from the calming zone to the region of transition, and
    a circulation gas compressor and a cooling device, the circulation gas compressor and the cooling device being sited in the circulation gas line,
    wherein the region of transition is adapted for transitioning the reaction gas from the circulation gas line into the reactor chamber, and
    wherein the region of transition is designed such that either no gas distributor plate is present or such that only a gas distributor plate is present which has a total surface area and has gas orifices, and wherein said gas orifices occupy more than 50% of the total surface area of said gas distributor plate,
    wherein the gas-phase fluidized-bed reactor has no internal heat exchanger in the reactor chamber, and
    wherein the polymerization takes place essentially in the reactor chamber and only to a minor extent parts of the polymer are circulated with the circulation gas,
    wherein, the reactor further comprises a closable flap situated in the region of transition from the circulation gas line into the lower section of the reactor chamber, and
    wherein the flap is adapted to prevent the penetration of polymer particles into the circulation gas line when the compressor is switched off.

2. A process as claimed in claim 1, wherein the closable flap is provided with uniformly distributed holes having a diameter of between 1 and 7 mm.

3. A process as claimed in claim 1, wherein between the reactor chamber and the compressor and the cooling device of the circulation gas line there is sited a cyclone to separate off polymer and catalyst particles from the circulation gas.

4. A process as claimed in claim 1, wherein polymerization is conducted in the presence of condensed monomers and/or condensed hydrocarbons.

5. A process as claimed in claim 1, wherein a mixture comprising gaseous and liquid monomers is fed into the reactor chamber.

6. A process as claimed in claim 1, wherein an ethylene-propylene-diene monomer rubber (EPDM) is prepared.

7. A process as claimed in claim 1, wherein the reactor chamber has an internal diameter of more than 0.5 m.

8. A process for polymerizing ethylene or for copolymerizing ethylene with $C_3$- to $C_8$-α-olefins, wherein the process comprises conducting a polymerization or (co)polymerization in a fluidized bed in a gas-phase fluidized-bed reactor, the reactor comprising
    a single reactor chamber in the form of a vertical tube said reactor chamber consisting essentially of a region of transition in the lower section of the tube, followed by a reaction zone which is followed by a calming zone in the upper section of the tube,
    a circulation gas line, wherein the circulation gas line is connected to the lower section of the reactor chamber, wherein the circulation gas line is directly connected to the upper section of the reaction chamber, and wherein the circulation gas line is adapted to convey a reaction gas from the calming zone to the region of transition, and
    a circulation gas compressor and a cooling device, the circulation gas compressor and the cooling device being sited in the circulation gas line,
    wherein the region of transition is adapted for transitioning the reaction gas from the circulation gas line into the reactor chamber, and wherein the reactor chamber has, in the region of transition, either no gas distributor plate or has a gas distributor plate having a total surface area and gas orifices which occupy more than 50% of the total surface area of said gas distributor plate, and
    wherein the gas-phase fluidized-bed reactor has no internal heat exchanger in the reactor chamber,
    wherein the reactor further comprises a closable flap situated in the region of transition from the circulation gas line into the lower section of the reactor chamber which flap is adapted to prevent the penetration of polymer particles into the region of transition from the circulation gas when the compressor is switched off.

9. A process as claimed in claim 8, wherein the closable flap is provided with uniformly distributed holes having a diameter of between 1 and 7 mm.

10. A process as claimed in claim 8, wherein between the reactor chamber and the compressor and the cooling device of the circulation gas line there is sited a cyclone to separate off polymer and catalyst particles from the circulation gas.

11. A process as claimed in claim 8, wherein the reactor chamber has an internal diameter of more than 0.5 m.

* * * * *